W. F. GOODWIN.

Harvester Rake.

No. 53,136. Patented March 13, 1866.

UNITED STATES PATENT OFFICE.

WILLIAM F. GOODWIN, OF WASHINGTON, DISTRICT OF COLUMBIA.

IMPROVEMENT IN HARVESTER-RAKES.

Specification forming part of Letters Patent No. 53,136, dated March 13, 1866.

*To all whom it may concern:*

Be it known that I, WILLIAM F. GOODWIN, of the city and county of Washington and District of Columbia, have invented certain new and useful Improvements in Harvesters; and I do hereby declare the following to be a full, clear, and exact description of the nature, construction, and operation of the same, reference being had to the accompanying drawings, which are made part of this specification, and in which—

Figure 1:
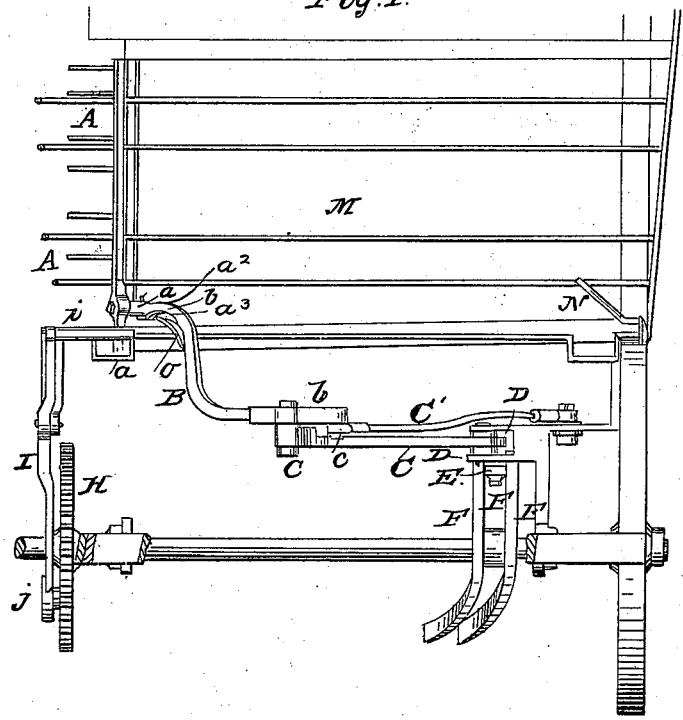
Figure 2:
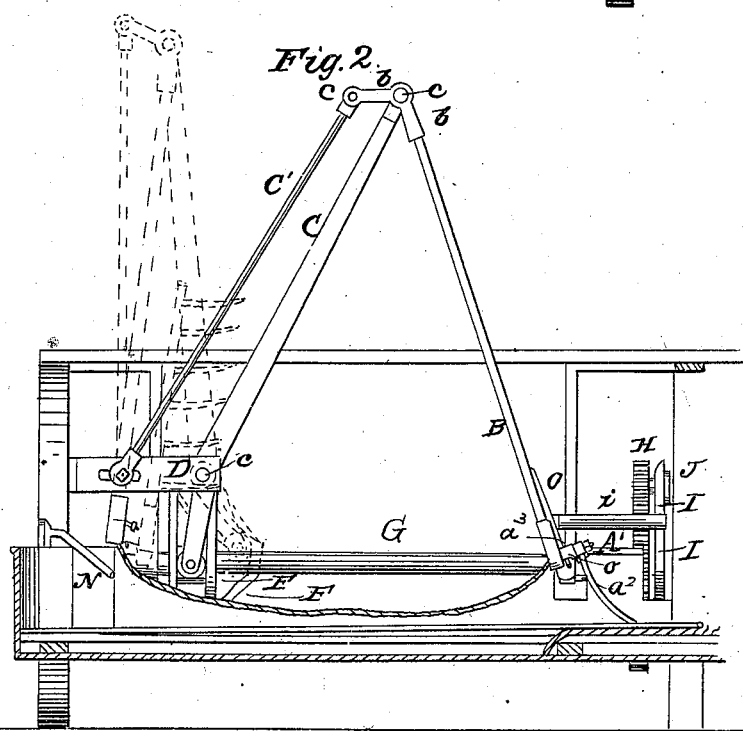

Figure 1 is a plan of a harvester embodying my improvements. Fig. 2 is a front view of the same.

Similar letters of reference indicate corresponding parts in the two figures.

This improvement relates to mechanism for operating the rake, which admits of being readily attached to different varieties of reaping-machines, which is of simple construction and very efficient in operation.

To enable others skilled in the art to which my invention appertains to fully understand and use the same, I will proceed to describe it in connection with the accompanying drawings.

The platform is represented as constructed to permit the grain to be swept off at one side, and to correspond therewith the rake is mounted so as to move from side to side. As this application has exclusive reference to the devices by which the rake is operated, I will limit the description to such devices, and refer to other parts only by way of elucidation.

A is the rake, whose head A' carries near its extremity a sleeve, $a$, which fits over a pin or stud on an arm, B, at the upper extremity of which is a bend or elbow, $b$, which admits of the attachment of said arm by pivots $c\ c$ to the upright arms C C'. (See Fig. 2.) The arm C is pivoted at $c'$ between lugs D D projecting from the main frame, and said arm C carries at its lower extremity a journaled roller, E, which works in the cam-groove F' of the wheel F F, which is keyed upon and revolved by the axle G. The working of the roller E in the cam-groove F' produces the vibration of the arm C, and through the latter the arms B C' derive a similar motion. The vibration of the arm B is sufficient to carry the rake A forth and back over the platform.

The grain is swept from the platform M at the side where the wheel H is located, and the rake is turned up into the position represented in red, so as to have it out of contact with the platform when making its return or ineffective stroke toward the opposite side of the machine. It is caused to assume this upright position by the stud $i$ on the pivoted vibrating lever I coming in contact with the projecting tail end $a'$ of the rake-head A'. The lever I is vibrated by a roller, J', on the wheel H, which is fixed upon and rotated by the axle G. When thus thrown up the rake A is prevented from going too far back by the contact of a pin, $a^2$, on sleeve $a$ with a pin, $b'$, on the arm B; and in its upright position the rake is moved to the opposite side of the machine, where it is thrown down in contact with the platform (so as to be adapted to make its effective sweep) by its tail end $a'$ coming in contact with the inclined arm or projection N, the rake being retained in its upright position by the pressure of a spring, O, on a pin, $a^3$, in the sleeve $a$. When the rake is thrown down into its horizontal position its weight is prevented from depending entirely upon the platform M by the contact of the pins $b'\ a^3$.

It is manifest the devices admit of various modifications as to arrangement to adapt them to machines of different form.

Having thus described my invention, the following is what I claim as new and desire to secure by Letters Patent:

1. Carrying the rake forth and back over the platform by means of the vibrating arm B, combined with the arms C C' and cam-wheel F F, the whole being arranged to operate substantially as described.

2. The combination, with the projection $a'$ on the rake-head, of the stud $i$, lever I, roller J, and wheel H, whereby the rake is thrown upon its end in an upright position, substantially as and for the purpose set forth.

3. In combination with a rake operating as described, pins or projections $a^2\ b'$, arranged and operating in the manner and for the purpose explained.

4. The arrangement of the spring O and pin $a^3$, whereby the rake is retained in an upright position during its ineffective stroke, as described.

WM. F. GOODWIN.

Witnesses:
W. F. HALL,
JAS. L. EWIN.